United States Patent [19]

Nothnagel

[11] Patent Number: 5,319,019
[45] Date of Patent: Jun. 7, 1994

[54] ACRYLIC POLYMER AQUEOUS DISPERSION WITH CO-SOLVENT

[75] Inventor: Joseph L. Nothnagel, Maple Grove, Minn.

[73] Assignee: Cargill Incorporated, Minneapolis, Minn.

[21] Appl. No.: 901,933

[22] Filed: Jun. 22, 1992

Related U.S. Application Data

[63] Continuation-in-part of Ser. No. 731,489, Jul. 17, 1991, abandoned.

[51] Int. Cl.$^5$ ............................ C08J 3/05; C08J 3/03; C08L 33/02; C08L 33/10
[52] U.S. Cl. ................................ 524/556; 523/336; 523/337; 523/339; 524/376; 524/801; 525/329.9
[58] Field of Search ................... 523/336, 337, 339; 524/376, 556, 801; 525/329.9

[56] References Cited

U.S. PATENT DOCUMENTS

| 4,255,308 | 3/1981 | Brasen | 260/29.6 |
| 4,458,040 | 7/1984 | Suzuki et al. | 523/412 |
| 4,579,888 | 4/1986 | Kodama et al. | 523/412 |
| 4,591,609 | 5/1986 | Kubo et al. | 523/336 |
| 4,714,728 | 12/1987 | Graham et al. | 525/329.9 |
| 5,051,464 | 10/1991 | Johnson et al. | 524/555 |
| 5,068,266 | 11/1991 | Kojima et al. | 523/336 |
| 5,102,946 | 4/1992 | Chen et al. | 524/521 |

FOREIGN PATENT DOCUMENTS

| 118009 | 9/1984 | European Pat. Off. |
| 288763 | 11/1988 | European Pat. Off. |
| 305850 | 3/1989 | European Pat. Off. |
| 1123285 | 8/1968 | United Kingdom |

*Primary Examiner*—Paul R. Michl
*Assistant Examiner*—Andrew E. C. Merriam
*Attorney, Agent, or Firm*—Fitch, Even, Tabin & Flannery

[57] ABSTRACT

Aqueous dispersions of an ammonia salt of an acrylic polymer and a method of making such dispersions are described.

11 Claims, No Drawings

ACRYLIC POLYMER AQUEOUS DISPERSION WITH CO-SOLVENT

This is a continuation-in-part application of Ser. No. 731,489 filed on Jul. 17, 1991, now abandoned. This application relates to aqueous dispersions and aqueous polymeric vehicles of high molecular weight acrylic polymers and a method for making such dispersions and polymeric vehicles. More particularly, this Application relates to the formation of aqueous dispersions of water dispersible ammonia salts of high molecular weight acrylic polymers from an azeotrope comprising ethylene glycol monobutyl ether, the azeotrope having a boiling point in the range of from about 95° C. to about 99° C.

BACKGROUND

For about the last fifty years, protective and decorative coatings based upon acrylic polymers have been increasingly used. These polymers have been utilized in many applications because they have provided a wide range of strength, flexibility, toughness, adhesion, degradation resistance and other film properties. Many acrylics, however, are solution polymers because they are prepared and applied as solutions of organic polymers in organic solvents. In coatings technology, polymeric vehicles which included thermoplastic acrylic polymers required the use of organic solvents which often are toxic and/or subject to regulation that demand their reduction in coating compositions.

Environmental concern has become increasingly important. This concern not only extends to preservation of the environment for its own sake, but extends to safety for the public as to both living and working conditions. Volatile organic emissions resulting from coating compositions which are applied and used by industry and by the consuming public are often not only unpleasant, but contribute to photochemical smog. Governments have established regulations setting forth guidelines relating to volatile organic compounds (VOCs) which may be released to the atmosphere. The U.S. Environmental Protection Agency (EPA) has established guidelines relating to the amount of VOCs released to the atmosphere, such guidelines being scheduled for adoption by the states of the United States. Guidelines relating to VOCs, such as those of the EPA, and environmental concerns are particularly pertinent to the paint and industrial coating industry which uses organic solvents which are emitted into the atmosphere.

The use of aqueous dispersions of polymeric vehicles, or alternatively, high solids polymeric vehicles are two general approaches that have been used to reduce VOCs in coating compositions. Aqueous systems have limited the molecular weights of the polymers used in the polymeric vehicle. This limited the hardness and other properties of the coating binders and films which resulted from the polymeric vehicles. Moreover, high levels of coalescents often have been required in aqueous thermoplastic vehicles. In water reducible systems with cross-linkers, as opposed to aqueous thermoplastic emulsions, molecular weights of polymers have been kept low and have required cross-linking.

The high solids approach often includes organic solvents or powder coatings. High solids, however, present problems in disposition of the polymeric vehicle. In powder systems requiring heat, disposition efficiency often is less and use of more than one color is difficult. Other high solids systems also may require specialized equipment because of the high solids content and the use of at least some organic solvents which are VOCs.

This invention is directed to aqueous systems which comprise aqueous dispersions of ammonia salts of acrylic polymers which dispersions are low in VOCs and have less than 2 weight percent organic solvent. Heretofore as described in the parent application to this application, dispersions of amine salts of high molecular weight acrylic polymers can be made by making the amine salt in a water immiscible solvent, mixing the salt, water and solvent to form a salt/solvent/water mixture, inverting the mixture to form a salt/solvent azeotrope and heating the azeotrope to remove the organic solvent and to provide a low VOC aqueous dispersion of the salt of the acrylic polymer having less than 2 weight percent of organic solvent. While the latter process and the dispersion made in the process are unique and advantageously provide extremely useful dispersions which may be used to provide polymeric vehicles and formulated coating compositions, certain problems exist for the process and compositions made by the process. Using amine salts in the process pragmatically limit products to polymeric vehicles and formulated coating compositions which are baked or thermoset. Amine salts of polymers generally are not suitable for polymeric vehicles and formulated coatings which are to be air dried at ambient temperatures into a film or coating binder. Air drying at ambient temperatures leave residual amines in the film. These residual amines frequently result in poor film performance and even may be deleterious to the substrate coated by the coating composition. At first blush, ammonia salts of the polymers would seem an easy answer to the problem of residual high boiling amines in the coating composition. These salts will not result in residual high boiling amines in an air dried coating binder. Ammonia salts of acrylic polymers, however, will not readily disperse in organic solvents; and as a result, solids levels of these polymeric salts are low (e.g. about 15%). As a result, extraordinary amounts of organic solvent generally would be required to make ammonia salts for use in making aqueous dispersions which would be suitable for use in making coating binders, polymeric vehicles and formulated coating compositions. The use of large amounts of organic solvent is not only expensive, but inappropriate with keeping VOC emissions low in manufacturing. Further, many organic solvent systems foam excessively during heating and azeotroping.

It is an object of this invention to provide water dispersions of high molecular weight acrylic polymers which dispersions have low VOCs.

It also is an object of this invention to provide a process without excessive foaming for making aqueous dispersions of high molecular weight acrylic polymers.

It is a further object of this invention to provide a low VOC cross-linkable polymeric vehicle which includes a high molecular weight acrylic polymer which is cured at elevated temperatures; or a polymeric vehicle which may be used in a coating composition which is air dried at ambient temperature.

Still further objects and advantages of the invention will be found by reference to the following description.

SUMMARY OF THE INVENTION

This invention provides a stable water dispersion having less than 2 weight percent organic solvent of a high molecular weight ammonia salt of an acrylic polymer having a molecular weight of at least about 12,000 and an acid value in the range of from about 15 to about 100 and preferably not above 75. Further, the water dispersion is stable even when substantially free of emulsifying agents. The water dispersion is the result of mixing a dispersion of an organic solvent selected from the group consisting of ethylene glycol monobutyl ether and a mixture of that ether with an organic solvent which is substantially immiscible in water, a water dispersible ammonia salt of the high molecular weight acrylic polymer and water. The ethylene glycol monobutyl ether may be used alone, or in an important aspect of the invention, in combination with a substantially water immiscible organic solvent. When used in combination with the water immiscible solvent, the monobutyl ether should not constitute more than about 25 weight percent of the total weight of organic solvents used including ethylene glycol monobutyl ether and should constitute at least about 10 weight percent of organic solvents, based upon the total weight of the organic solvents.

The acrylic polymer ammonia salt preferably is formed in situ in the organic solvent with water being added to the ammonia salt/organic solvent combination. In an alternate embodiment of the invention, however, the acrylic polymer is dispersed in the organic solvent and water, which includes ammonia in an amount effective for neutralizing the polymer, is added to the organic solvent/polymer dispersion to neutralize the acrylic polymer to an ammonia salt. The organic solvent to water ratio is at least greater than about 1:1 and preferably is at least 2:1 when the water/acrylic polymer/organic solvent dispersion are mixed together. An organic solvent to water ratio less than 1:1 would tend to waste organic solvent.

After mixing the water/acrylic polymer or acrylic polymer ammonia salt/organic solvent mixture, that mixture is inverted and the organic solvent is removed by heating or distilling the inverted mixture of the water/organic solvent/acrylic polymer ammonia salt as an azeotrope comprising the water and organic solvent. Water which is distilled from the water and acrylic polymer ammonia salt and organic solvent dispersion is circulated back to that dispersion to increase the water content thereof relative to the organic solvent.

In an important aspect of the invention, it has been surprisingly found that when xylene is added to the distillate in an amount of at least 16 weight of the distillate and xylene, the ethylene glycol monobutyl ether becomes immiscible with the water below about 117° C. and readily may be separated from the water in the distillate. Above 117° C. the ether separates from water as well.

The invention permits manufacture of the water dispersion from the polymer using one reaction vessel. The azeotrope has a boiling point of above about 95° C., but not more than about 99° C. and preferably between about 95° C. and about 98° C. The acrylic polymer used in the invention has a molecular weight of at least about 12,000. The ether/water immiscible organic solvent combination should have a boiling point of at least above about 100° C. and the amount of water in the ammonia salt/organic solvent/water mixture during the heating or distilling of the azeotrope should be maintained in an amount effective to provide a solids level in the final aqueous dispersion that is desired. The water dispersion of the invention does not require emulsifying agents and does not have more than about 2 weight percent organic solvent after the distillation or heating of the azeotrope which removes the organic solvent to the level of less than 2 weight percent level of the aqueous dispersion of the acrylic polymer ammonia salt.

The water dispersion of the invention includes the water dispersible ammonia salt of the high molecular weight acrylic polymer as well as the unsalified polymer, but the aqueous dispersion of the invention does not have less than 60 percent of the free carboxyl groups of the acrylic polymer neutralized or converted into an ammonia salt. As the acid number of the polymer goes down, the higher the percent of the carboxyl groups on the acrylic polymer must be neutralized. To maintain the dispersion below an acid value of about 40, about 100% of the carboxyl groups on the polymer should be neutralized to the ammonia salt. In an important aspect of the invention, about 100% of the carboxyl groups on the acrylic polymer are neutralized to the ammonia salt and the dispersions of the invention do not have more than about one pound per gallon of dispersion (120.0 g/l) VOCs. The water dispersion of the invention is stable through at least 5 freeze-thaw cycles, about −5° C. for the freeze cycle and about 25° C. for the thaw cycle wherein the freeze and thaw cycle are each 24 hours.

An important aspect of the invention is a polymeric vehicle which may be air dried at ambient temperatures to provide a coating binder of a coating composition. In this aspect of the invention, as well as the aspect of the invention which provides a coating binder which is thermoset with a cross-linking agent above ambient temperatures, the polymeric vehicle which includes the water dispersion of the invention provides a formulated coating composition having VOCs of less than one pound per gallon of formulated coating composition, includes water dispersible acrylic polymers and ammonia salts thereof having molecular weights in the range of from about 30,000 to about 300,000 and not only eliminates a need for, but is substantially free of emulsifiers, surfactants and coalescents. Water dispersions of such high molecular weight acrylic polymers provide an acrylic coating binder with improved film performance characteristics which include, but are not limited to improved lay down performance of the wet film, enhanced film build of the film per pass, faster dry fiber times, improved corrosion resistant films, harder films, more abrasion resistant films, and improved humidity resistant films. The polymeric vehicle of the invention also provides coating binders for improved exterior "ultraviolet resistant" durable films which are derived from an aqueous low VOC formulated coating composition. Films provided from the invention are improved over that of aqueous thermoplastic emulsions or water reducible systems of low molecular weight thermoplastic or those thermosetting polymers requiring cross-linking.

Another important aspect of the invention is the process for making the aqueous dispersion and polymeric vehicle of the invention. In the process for making a water dispersion of a water dispersible ammonia salt of an acrylic polymer, the ammonia salt of the acrylic polymer is the reaction product of a mixture comprising an acrylic polymer having hydroxyl groups, ammonia and an organic solvent as described above in a neutralization reaction. The acrylic polymer has a molecular weight of at least about 12,000, has free carboxyl groups and an acid value in the range of from about 15 to about 100. The process comprises adding water to a dispersion of the acrylic polymer or the ammonia salt of the acrylic polymer in the organic solvent selected from the group consisting of ethylene glycol monobutyl ether or a combination of the ether and a substantially water immiscible organic solvent, to form an acrylic polymer ammonium salt/organic solvent/water mixture. The organic solvent and water form an azeotrope having a boiling point in the range of from about 95° C. to about 99° C. The mixture is a water in organic solvent dispersion which is inverted and forms organic solvent in water dispersion. The dispersion forms the azeotrope. The azeotrope is heated to remove the organic solvent. Upon heating both water and organic solvent are removed as the azeotrope and condensed. Xylene is added to the water and ether being removed and condensed from the water dispersion to effect a separation of the condensed ether and water. This permits circulation of the water separated from the ether back into the mixture to provide an aqueous dispersion of the ammonia salt of the acrylic polymer having less than 2 weight percent of organic solvent.

The ammonia salt preferably is formed in situ in the organic solvent and is dispersed therein. Thereafter, the water to form the azeotrope is added to the acrylic ammonia salt and organic solvent dispersion. At some point during the addition of the water to the acrylic salt and organic solvent, an inversion takes place wherein the particulate water droplets are no longer coated with dispersed acrylic polymer, but droplets of acrylic polymer are surrounded by water, excluding the solvent as the dispersing media. Thereafter the organic solvent is removed as an azeotrope comprising the organic solvent and water by heating the dispersion to a temperature in the range of from 95° to about 99° C. and circulating water from the distillate back to the heated water dispersion of acrylic ammonia salt/organic solvent/water. The addition of at least about 16 weight percent xylene, based upon the weight of the water/organic solvent-xylene mixture, causes the separation of the ether of the organic solvent from the water, as previously described, so that the water may be circulated back into the heated aqueous dispersion which is being heated or distilled to remove the organic solvent. The process permits the removal of the organic solvent with a resulting water dispersion of an ammonia salt of a high molecular weight acrylic polymer.

In another important aspect of the invention, the acrylic polymer is a reaction product of a precursor acrylic polymer and a diisocyanate.

DESCRIPTION OF THE PREFERRED EMBODIMENTS

As used in this application, "polymer" means a polymer with repeating monomeric units. "Polymeric vehicle" means all polymeric and resinous components in the formulated coating, i.e., before film formation, including but not limited to the water dispersible salt of an acrylic polymer. The polymeric vehicle may include a cross-linking agent. "Coating binder" means the polymeric part of the film of the coating after solvent has evaporated, and with a thermosetting polymeric vehicle after cross-linking. "Formulated coating" means the polymeric vehicle and solvents, pigments, catalysts and additives which may optionally be added to impart desirable application characteristics to the formulated coating and desirable properties such as opacity and color to the film. "VOC" means volatile organic compounds and "low VOC" in connection with a dispersion or formulated coating composition means about 1 pound per gallon or about 120.0 grams of volatile organic compounds per liter of dispersion or formulated coating composition. "Volatile organic compounds" are defined by the U.S. Environmental Protection Agency as any organic compound which participates in atmospheric photochemical reactions, except for specific designated compounds which have negligible photochemical activity. Water is not a VOC. The following compounds generally have been designated as VOCs. VOCs include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromomethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylestersulphuric acid, dimethyl-butanone, pentachloroethane, trichloro-trifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloro ethane, trichloroethane, 2,3-dimethylbutane, tetrachloroethane, dimethyl-3-methylenebicyclo-heptane, A-pinene, hexachloro-butadiene, methylnaphthalene, naphthalene, quinoline, methylnaphthalene, phenyl-propanone, dimethylbenzene, O-cresol, chloro-methyl-benzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethyl-benzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichlorobenzene, trimethyl-pyridine, bromobenzene, methylcyclohexane, toluene, chlorobenzene, phenol, 2-methylpyridine, pentene, 1-pentane, bromochloro-propane, 1H-pyrrole, tetrahydrofuran, hexane, 1,4-dichlorobutane, cyclohexane, cyclohexene, pyridine, octane, 1-octene, nonane, dodecane, propene, 2-methyl-1-pentene, 2-methyl-1-propene, isoquinoline, trichlorobenzene, propanal, butanal, 1,4-(dioxane), 1-nonene, decane, dibromochloromethane, 2-chloro-butadiene, tetrachloroethene, dimethyl-methylene-bicyclo-heptane, 1,2-diethylbenzene, (1-methylpropyl)-benzene, Acetic Acid ethyl-ester, 1,3-diethylbenzene, cyclopentene, heptane, cis-dichloroethene, trans-dichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethyl-pentane, decamethylcyclo-pentasil-oxane, 1,3- dichlorobenzene, hexadecane, 2-methylthiophene, 3,3-dimethylpentane, 3-methyl-1-butene, 2-methyl-1-butene, 2,2,3-trimethylpentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicyclo-heptane, (E)-2-heptene, 4-methylnonane, tetrachlorobenzene, butene, chloronitrobenzene, dichlorobenzene, dichloroethene, tetramethyl benzene, bromopropane, dichloro-1-propene, chlorobenzeneamine, dimethylcyclohexane, dichloronitrobenzene, dichloronaphthalene, dimethylcyclopentane, bromomethylbenzene, dichloromethyl-benzene, benzenedicarboxal-dehyde, benzoyl nitro peroxide, bromochloropropane, dibromo-chloro-propane, pentachlorobutadiene, dibromochloropropane, 2-butoxyethanol, bromopentachloro ethane, tetradecamethylcycloheptasiloxane, trimethyl-pentanediol, dodecamethylcyclo-hexasil-oxane, hexamethylcyclotrisiloxane, octamethylcyclo-tetrasil-oxane, hexadecamethylcyclooctasil-oxane, tridecane, tetradecane. "Film" is formed by application of the formulated coating to a base or substrate, evaporation of solvent, if present, and cross-linking if a cross-linking resin is present and/or required. "Thermoplastic polymeric vehicle" is a polymeric vehicle which does not require cross-linking to provide a film for a coating binder. "Thermosetting polymeric vehicle" is a polymeric vehicle which requires heat and cross-linking to provide a film for a coating binder.

"Azeotrope" is a mixture of two or more liquids and that mixture behaves as if it were only one liquid, that is, having a distinct boiling point and a defined and constant composition of the two or more liquids which make up the "azeotrope". Although most azeotropes are solutions, cases are encountered in which the azeotrope separates into phases. Such a mixture is a "constant boiling mixture" and for the purposes of this application such a mixture is an azeotrope. In reference to organic solvents, "substantially water immiscible" or "substantially immiscible in water" means that less than 100 g/L of organic solvent is soluble in water at 25° C.

"Acrylic polymer" means a polymer or copolymers of

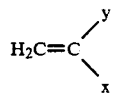

wherein y = CH₃ or H

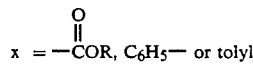

R = straight chain or branched alkyls having 1 to 12 carbons,

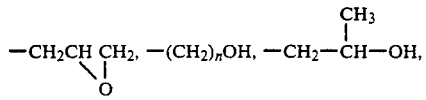

n = 2 to 7.

In the case of hydroxy-substituted alkyl acrylates the monomers may include members selected from the group consisting of the following esters of acrylic or methacrylic acid and aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene-glycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxy-propyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

"Air dried formulated coating composition" means a formulated coating composition that produces a satisfactory film without heating or baking, but which provides a satisfactory film at ambient temperature.

"Baked formulated coating composition" means a formulated coating composition that provides optimum film properties upon heating or baking above ambient temperature.

"Water dispersion of an ammonia salt of an acrylic polymer" means a dispersed ammonia salt of an acrylic polymer in a water media.

"Substantially free of emulsifier" means a composition with not more than about 0.5 weight percent emulsifiers. An acrylic polymer is substantially completely neutralized if about 100% of its free carboxyl groups are salified.

"Chlorinated polyolefin" means a hydrocarbon which has been grafted with Cl using chlorine and contains from about 15 to about 35 weight percent Cl and where after such grafting the polyolefin will have a molecular weight of at least about 10,000 and preferably in the range of from about 20,000 to about 100,000. Generally these compounds are made by reacting chlorine with a saturated hydrocarbon in a free radical reaction where the Cl replaces a hydrogen in the polymer.

According to the invention, a stable water dispersion of a water dispersible ammonia salt of an acrylic polymer is formed by heating a water dispersible ammonia salt of the acrylic polymer, water, an organic solvent selected from the group consisting of ethylene glycol monobutyl ether or a combination of that ether and a substantially water immiscible organic solvent to drive off the organic solvent by distillation of the azeotrope formed by the organic solvent and water. The acrylic polymer has free carboxyl groups which may be neutralized, an acid value in the range of from about 15 to about 100 and a molecular weight of at least about 12,000.

The organic solvent must azeotrope with water with such azeotrope having a boiling temperature in the range of from about 95° C. to about 99° C., and preferably in the range of from about 95° C. to about 98° C. In an important aspect of the invention, the organic solvent is a combination of two organic solvents one of which is ethylene glycol monobutyl ether in an amount of from about 10 to about 25 weight percent of the total organic solvent present. When ethylene glycol monobutyl ether is used in combination with a substantially water immiscible organic solvent, it has been surprisingly found that when xylene is added to the distillate in an amount of at least 16 weight percent of the distillate and xylene, the ethylene glycol monobutyl ether becomes immiscible with the water below about 117° C. and readily may be separated from the water in the distillate.

Foaming is especially acute for dispersions made with organic solvents which azeotrope with water at a temperature greater than 95° C. In making water dispersions of the polymeric ammonia salts by heating mixtures of the acrylic polymer ammonia salt, organic solvent and water, foaming is a problem for all organic solvents. The use of the monobutyl ether as an azeotrope with water above about 95° C. and below about 99° C. allows the stripping off of the ether or organic solvents combined with the ether. When combined with the ether, a lower boiling organic solvent/water azeotropes with little or no resulting foaming. Thereafter the stripping off of the monobutyl ether/water azeotrope proceeds with little or no foam. Ethylene glycol monobutyl ether meets all the requirements for a solvent which will provide low VOC aqueous dispersions of ammonia salts of high molecular weight acrylic polymers. This particular ether solubilizes the acrylic ammonia salt, azeotropes with water at a temperature range of from about 95° to about 98° C., can be readily separated from water and acts as a defoamer.

Excess foaming prevented by high stirring rates or excess inert gas sparging often leads to loss of ammonia with a resulting collapse of the dispersion, and at the least, results in increased particle size in the dispersion. While not intending to be bound by any theory, it is believed that in preparing an acrylic dispersion from an acrylic ammonia salt if high stirring rates and/or inert gas sparge are used, ammonia hydroxide used to make the salt would be swept from the reactor and lost to the dispersion. The incorporation of ethylene glycol monobutyl ether in the solvent mix acts as a defoamer to eliminate foaming during the distillation of the azeotrope. Since the water immiscible organic solvents (i.e. xylene, toluene, methyl-n-amyl ketone) azeotrope with water in the boiling point range of 92°-95° C., it is believed that these solvents are removed and the ethylene glycol monobutyl ether is left in the reactor and acts as a defoamer. As the reactor temperature is raised to 96°-98° C. as the organic solvent content is reduced to zero, the ether azeotropes with water and is removed from the system. Foaming is not a problem even when a low concentration of the ether is left in the reaction, because the ether is an excellent defoamer.

The boiling point of the substantially water immiscible organic solvent combined with the ether should be at least above about 100° C. to allow an appropriate temperature to polymerize acrylic monomers to a desired molecular weight. Such a boiling point should also be effective for permitting the extension reaction required when the acrylic polymer with an active hydrogen is chain extended with a diisocyanate as hereinafter described. Typical organic solvents which may be used in the invention include but are not limited to: aliphatic hydrocarbons such as hexane, VM & P naphtha which is an aliphatic hydrocarbon solvent and Mineral Spirits which has a boiling point of about 165° C.; aromatic hydrocarbons such as toluene, xylene, Aromatic 100*, Aromatic 150*; ketones such as acetone, methyl ethyl ketone, methyl isobutyl ketone, methyl amyl ketone, cyclohexanone, isophorone; and esters such as ethyl acetate, n-butyl acetate, amyl acetate, ethylene glycol monoethyl ether acetate, ethylene glycol monobutyl ether acetate, propylene glycol monomethyl ether acetate with the following solvents being preferred: xylene, methyl-n-amyl ketone, ethoxy ethyl propionate, Mineral Spirits, Aromatic 100, Aromatic 150, Exxate 600** (boiling point of about 165° C. to about 175° C.), Exxate 700 (boiling point of about 180° C. to about 185° C.). After or during the addition of water to the dispersion of the acrylic polymer and conversion of that polymer to the acrylic polymer salt, or to the dispersion of the acrylic polymer salt, the water/salt/organic solvent mixture undergoes an inversion and forms an oil in water dispersion and an azeotrope. The azeotrope is heated or distilled to drive off the ether and/or water immiscible organic solvent for a time and temperature sufficient to leave less than 1 pound/gallon VOC or at least less than about 2 weight percent organic solvent.

* Aromatic 100 and 150 are trade names of Exxon Chemical Company. Aromatic 100 and Aromatic 150 are aromatic solvents having boiling points of about 185° C. and about 195° C. to about 200° C., respectively.
** Exxate is a trade name of Exxon Chemical Company and Exxate 600 and Exxate 700 are alkyl propionate solvents.

The invention permits aqueous dispersions of acrylic polymers having high molecular weights. These molecular weights may range from about 12,000 to about 300,000. Moreover, from about 5 to about 20 weight percent chlorinated polyolefin may be incorporated into the acrylic polymer by reacting the chlorinated polyolefin with the acrylic polymer or monomers thereof to make the acrylic polymer. The incorporation of chlorinated polyolefin improves the adhesion properties of the polymeric vehicle of the invention, especially to thermoplastic polyolefin substrates such as those commercially available under the names Dexter 813 or Dexter 815 type TPO. These thermoplastic polyolefins are particularly used in the automobile industry such as in making exterior body parts or interior molding where adhesion properties for polymeric vehicles for paint coatings are particularly important.

To permit water dispersibility and neutralization to a salt, the acrylic polymer should have an acid value in the range of from about 15 to about 100 and preferably not more than about 75. In an important aspect of the invention, the amine salt of the acrylic polymer is made by dispersing the acrylic polymer with carboxylic acid functionality into the organic solvent. Thereafter the acrylic polymer is neutralized. After that neutralization, water having a pH above about 7 is added to the solvent/acrylic polymer salt dispersion. The organic solvent to water ratio is at least 1:1 when the water/acrylic polymer/ or polymer salt/organic solvent dispersion are mixed together, and preferably the ratio is from about 2 to about 1. The pH of the water is above 7 to assure formation and maintenance of the acrylic ammonia salt. An aqueous solution of ammonium hydroxide having an ammonium hydroxide concentration in the range of from about 0.03 to about 0.10 weight percent may be used.

In an important aspect of the invention, the acrylic polymer in the dispersion is substantially completely neutralized with ammonia and preferably should have excess ammonia added effectively giving about 25% to about 50% more amine or ammonia than required for 100% neutralization of the polymer. This prevents a deficiency of ammonia and a pH drop in the dispersion caused by the ammonia loss during distillation and storage. Without excess ammonia, the pH of the dispersion could drop below 7 and destabilize the dispersion. Such excess ammonia is also important when water is added to an organic solvent/polymer dispersion for neutralization of the polymer upon addition of the water ammonia combination.

During and immediately after the addition of water to the organic solvent/acrylic polymer or polymer salt dispersion, and after the inversion, the organic solvent is removed by distilling or heating the azeotrope. The distillation occurs between about 95° C. and about 98° C. and the temperature may be held in that temperature range during the addition of the water. Thereafter the temperature is raised to above about 98° C. to about 99° C. to remove any remaining solvent and to reduce VOCs to less than about 1 pound per gallon of dispersion. A column packed with glass or metal saddles preferably is used for this distillation. Additional water is added as needed to allow for the water in the solvent/water azeotrope removed by the heating or distillation. The additional water is added to maintain the dispersion and to provide the desired solids level for the aqueous dispersion after the distillation. By way of example, if there is an initial 2:1 solvent to water ratio, for a 40% solids level in the final aqueous dispersion, it is expected that an additional 60 parts water will have to be added. The organic solvent is removed to provide an aqueous dispersion having not more than about 2 weight percent organic solvent in about 10 to about 12 hours with a solids level in the range of from about 30 to 40 weight percent.

During the removal of organic solvent, ammonia also can be removed from the aqueous dispersion. The amount of ammonia lost will be a function of the boiling point of the azeotrope. Loss of ammonia may affect the stability of the water dispersion of the acrylic polymer because as the molecular weight of the polymer increases and/or acid value of the polymer decreases, the greater percent polymer salt will be required in the aqueous dispersion to maintain the stability thereof. Water removed from the aqueous dispersion and which condenses and separates from the organic solvent contains the ammonia being removed from the dispersion. To over come the loss of some of the ammonia during the distillation or heating to remove the organic solvent, the ammonia containing water in the distillate is returned back into the dispersion to not only save on the amount of water used in making the dispersion, but also to overcome the loss of the ammonia from the dispersion. Excess ammonia is added to the aqueous dispersion, as previously described, in an amount effective to maintain the stability of the dispersion. After removal of the organic solvent, the temperature of the system is lowered. In general, sufficient ammonia (or amine) is added such that the pH of the aqueous dispersion is above 7, is preferably between about 7 and about 8.5 and most preferably about 8.5. If an amine is used, the amine used to maintain the neutralization and pH of this dispersion may be any mono or even polyamine. If the acrylic polymer has a cross-linking functionality and is to be cross-linked, a cross-linking resin is added.

An important aspect of this invention is a polymeric vehicle which provides a formulated coating composition which has VOCs of 1 pound/gallon or lower and permits formulated coating composition having a solids content of about 30 to about 40 weight percent. The latter solids content permits the use of standard or common coating application equipment without readjustment. Moreover, this aspect of the invention also provides new coating binder and film performances as previously described. Further, improved humidity resistant films and improved exterior "ultra violet" resistant films are obtainable with a low VOC, 30 to 40% solids water dispersed formulated coating composition which includes the ammonia salt of the high molecular weight acrylic polymer described herein. Acrylic polymers having molecular weights in the range of from about 30,000 to about 300,000 may be used to attain the low VOC formulated coating composition which results in a tough degradation resistant coating binder. The polymeric vehicle and formulated coating composition of the invention reduce or eliminate the need for surfactants and coalescents and are substantially free of them. Further, the polymeric vehicles and formulated coating compositions of the invention may be thermoplastic or may be thermosetting and include cross-linking resins.

In a particularly important aspect of the invention, an acrylic polymer, which could have a lower molecular weight such as below about 12,000 and which would be a precursor acrylic polymer, is subjected to an extension reaction with a polyol such as a diol or triol with a diisocyanate. As a result, where the extension reaction is with a diisocyanate, the acrylic polymer not only needs a carboxyl functionality to neutralize, but also requires a functionality reactive with isocyanate such as an active hydrogen, hydroxyl or oxirane. In addition to the diisocyanate extension reaction with the low molecular weight acrylic polymer, additional extension can take place if a polyol such as a diol, triol or an amine, diamine or triamine, primary or secondary are added to the acrylic/diisocyanate reaction as co-reactants. The extension reaction provides an extended acrylic polymer having a molecular weight in the range of from about 30,000 to about 300,000 and an acid value of from about 15 to about 100. Diisocyanates and biurets may be used in the extension reaction. Diisocyanates which are particularly important in this aspect of the invention include hexamethylene diisocyanate (HMDI), hexyl diisocyanate (HDI), isophrone diisocyanate (IPDI), tetramethylxylene diisocyanate (TMXDI), toluene diisocyanate (TDI) and hydrogenated methylene diphenyl diisocyanate ($H_{12}MDI$). Polyols which may be used in the invention, but are not limited to, include: trimethyol propane, diethylene glycol, propylene glycol, polyethlene glycols or poly caprolactone polyols. Amines which may be used in the invention, but are not limited to, include: ethyl pentaethylene diamine, menthane diamine polyoxypropylene poly amines, triethanol amine or (1,4-Bis (3-aminopropyl) piperazine).

Where the acrylic polymer is extended with a diisocyanate to provide an isocyanate extended urethane linkage, ammonia may not only be used to neutralize the acrylic polymer, but also increases the pH of the mixture of the acrylic polymer in the organic solvent which will drive the isocyanate extension reaction to completion. Thereafter, aqueous ammonium hydroxide is slowly mixed with the chain extended acrylic polymer to form the salt of that extended polymer, as previously described. The chain extended polymer/organic solvent combination is neutralized as previously described in connection with acrylics which are not extended. Once the organic solvent has been removed, as previously described, the temperature of the system is reduced. If the acrylic polymer has a cross-linking functionality, a cross-linking resin such as a melamine or isocyanate can be added to form the polymeric vehicle. Typical solids of the polymeric vehicle are in the range of from about 30 to about 40% solids.

The polymeric vehicle of the invention which includes the extended acrylic polymer is made in the same way as when an "unextended" acrylic polymer is used in the invention. The extended acrylic polymer helps to develop ultimate film performance because the molecular weight of the acrylic polymer should be as great as possible. Any extension of the acrylic polymer should be done in the organic solvent phase or media.

The following examples set forth exemplary methods of making the aqueous acrylic dispersions and polymeric vehicles according to the invention.

EXAMPLE I (A.) Preparation of the Acrylic Polymer

| Ingredient | Parts |
|---|---|
| A. Xylene | 33.1 |
| B. Methyl-n-Amyl Ketone | 16.0 |
| C. Methyl Methacrylate | 8.7 |
| D. Butyl Methacrylate | 0.6 |
| E. Hydroxy ethyl Methacrylate | 1.9 |
| F. Lauryl Methacrylate | 3.5 |
| G. Methacrylic Acid | 5.4 |
| H. Styrene | 21.8 |
| I. t-Butyl Peroxyacetate | 9.0 |

Xylene and the methyl-n-amyl ketone are charged into a reactor and heated to a reflux temperature of from about 135° C. to about 140° C.

A premix of ingredients C, D, E, F, G, H and about 80% of I are added dropwise over 4 hours which reaction mix then is held at 135°–145° C. at reflux for about 1 hour. Thereafter, the remaining I (tert-butyl peroxyacetate) is added over three hours. After the addition of ingredient I, the reaction temperature is about 138° C. and thereafter dropped to about 70° C. The resulting acrylic polymer has a Tg of about 20° C.

(B.) Inversion of Acrylic Polymer

To invert the acrylic polymer and drive off the solvent requires an azeotrope of the solvents with water and ammonia to form the acrylic salt which is soluble in water.

Procedure:

Charge acrylic polymer in solvent into a reactor. Heat to 60° C. and add ammonia (28% solution). Hold for 5–10 minutes with slow agitation.

Add water as fast as possible into the reactor. The temperature of reactor prior to water addition should be 60°–70° C. Once all the water is added, heat to 98° C. under slow agitation. The introduction of water to the reactor does not have to be time controlled, so to save kettle time, add the water as fast as possible.

Once water is added and heating is begun, the azeotrope of solvent and water will begin at approximately 91° C. Once distillation begins, heat gradually but continuously to 98°–99° C.

As the azeotrope distills off, allow separation of the solvent from the water in the decanter, draw off the solvent to a solvent storage tank and continuously return the water from the decanter to the reactor. The water carries any ammonia which may have been swept from the reactor by the azeotrope back to the reactor to form the acrylic salt to stabilize the dispersion. During the distillation of the azeotrope, especially above 95° C., some ammonia may be needed to replenish lost ammonia which has gone up the condenser. Addition of ammonia would be best sub-surface rather than at the top of the reactor, to minimize the evaporation and loss of ammonia during addition.

Once temperature of the azeotrope goes above 96° C., all of the xylene and methyl-n-amyl ketone has been distilled from the system. Between 96°–98° C., ethylene glycol monobutyl ether will be the solvent to azeotrope with water in the distillation. To maximize the separation of the ethylene glycol monobutyl ether from the water in the decanter, a minimum of water should be in the decanter and a maximum of solvent blend, xylene, methyl-n-amyl ketone. There should be a slow bleed from the solvent storage tank to the decanter of the solvent blend of xylene 45%, methyl-n-amyl ketone 25% and ethylene glycol monobutyl ether from the azeotrope separating from the water of the azeotrope.

Above 98° C., water will be the only species distilling from the reactor since all of the solvents have been removed. Prolonged distillation above 98° C. will increase reactor time and destabilize the dispersion by driving off the ammonia.

After the distillation of the ether the temperature of the reactor is reduced and the PH and viscosity of the dispersion are adjusted using ammonia (28% solution) and water (deionized).

EXAMPLE II (A.) Preparation Of The Acrylic and Chlorinated Olefin Copolymer

| Ingredient | Parts |
|---|---|
| A. Xylene | 17.10 |
| B. Methyl-n-Amyl Ketone | 8.55 |
| C. Styrene | 2.38 |
| D. Methyl Methacrylate | 5.80 |
| E. Lauryl Methacrylate | 17.32 |
| F. Methacrylic Acid | 3.07 |
| G. Hardlin 14 LLB (Chlorinated Polyolefin)* | 10.00 |
| H. Hydroxyethyl Acrylate | 1.67 |
| I. t-Butyl Peroctoate | 0.65 |
| J. t-Butyl Peroctoate | 0.06 |
| | 66.60 |

*This is a polyolefin sold by Tayo Kasei Kogo Co which has 27 ± 1 weight percent chlorine based upon the weight of the resin and which has a molecular weight of about 45,000.

Xylene and the methyl-n-amyl ketone are charged into a reactor and heated to a temperature of from about 90° C. to about 95° C.

A premix of ingredients C, D, E, F, G, H and I are added dropwise over two hours which reaction mix then is held at 90°–95° C. for about one hour. Thereafter, the remaining t-butyl peroctoate (J) is added. After the addition of ingredient J, the reaction temperature is 90°–95° C. and thereafter dropped to about 70° C. The resulting acrylic polymer has a Tg of about 10° C.

(B.) Extension Of The Acrylic Polymer, Ammonia Hydroxide Salification of The Polymer And Making The Aqueous Acrylic Polymer Dispersion From An Azeotrope The following ingredients are used to make a water dispersion of ammonia hydroxide salt of the acrylic polymer of Part A of Example II.

| Ingredient | Parts |
| --- | --- |
| J. Methyl pentaethylene diamine | 0.4 |
| K. Tetramethyl Xylene Diisocyanate | 2.9 |
| L. Ethylene glycol monbutyl ether | 10.0 |
| M. Ammonia Hydroxide (28% Solution) | 2.9 |
| N. Water (Deionized) | 87.9 |
| O. Ammonia Hydroxide (28% Solution) | 1.0 |

Methyl pentaethylene diamine (J) and tetramethyl xylene diisocyanate (K) are added to the reaction product of Part A at 70° C. and held at temperature for about 15 minutes. Thereafter the temperature of the reaction mixture is raised to about 90° C. and held at that temperature for about 2 hours to complete the reaction of the diisocyanate and the diamine and hydroxyls of the polymer, resulting in an extended polymer. The temperature of the reaction is then lowered to 80° C. and ethylene glycol monobutyl ether (L) is added, followed by the addition of ammonia hydroxide (M) resulting in a salification reaction between the ammonia and carboxyls of the extended polymer forming an extended polymer salt in immiscible/ether solvents. Dispersion of the resulting extended polymer salt is now carried out as outlined below.

Water (N) and ammonia hydroxide (O) are charged to a clean kettle and the temperature is raised to 92°-95° C., but not greater than 96° C. The extended polymer salt/solvent mixture from above is added to the kettle of water and ammonia hydroxide over a two to four hour period, while distilling of the azeotrope of water and xylene/methyl-n-amyl ketone/and toluene (from the Hardlin polyolefin).

After the addition of the polymer salt is completed, the temperature of the reaction is raised to 96°-98° C. to distill the azeotrope of water and ethylene glycol monobutyl ether. The processing of the dispersion continues as described in prior example, reducing the solvent content to less than 2% and then lowering the temperature of the reaction and adjusting with ammonia hydroxide and water the pH and viscosity of the resulting acrylic dispersion.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A process for making a water dispersion of a water dispersible ammonia salt of an acrylic polymer, the ammonia salt of the acrylic polymer being the reaction product of a mixture comprising the acrylic polymer having carboxyl groups, ammonia and an organic solvent selected from the group consisting of ethylene glycol monobutyl ether and a mixture of the ether and a substantially water immiscible organic solvent in a neutralization reaction, the acrylic polymer having a weight average molecular weight in the range of from about 30,000 to about 300,000 and an acid value in the range of from about 15 to about 100, the dispersion having at least about 30 weight percent acrylic polymer and salts thereof as solids, the process comprising:

adding water to a dispersion of the acrylic polymer or the ammonia salt of the acrylic polymer in the organic solvent, to form an acrylic polymer ammonium salt/organic solvent/water mixture, the organic solvent and water being in amounts effective for forming an azeotrope having a boiling point in the range of from about 95° C. to about 99° C.;

inverting the mixture and forming an organic solvent in water azeotrope; and heating the azeotrope to remove the organic solvent; condensing the water and organic solvent being removed from the water dispersion;

adding xylene to the water and ether being removed from the dispersion to effect a separation of the ether and water; and circulating the water separated from the ether back into the mixture to provide an aqueous dispersion of the ammonia salt of the acrylic polymer having less than 2 weight percent of organic solvent.

2. A process as recited in claim 1 wherein the reaction mixture includes the substantially water immiscible organic solvent to provide at least two organic solvents, one of which is ethylene glycol monobutyl ether, the mixture of solvents comprising from about 10 to about 25 weight percent ethylene glycol monobutyl ether, based upon the weight of organic solvent.

3. A process as recited in claims 1 or 2 wherein the acrylic polymer has an acid value in the range of from about 30 to about 75.

4. A process as recited in claims 1 or 2 wherein the acrylic polymer is the reaction product of an extension reaction of a precursor acrylic polymer and diisocyanate.

5. A process as recited in claim 3 wherein the acrylic polymer is the reaction product of an extension reaction of a precursor acrylic polymer and diisocyanate.

6. A process as recited in claims 1 or 2 wherein the acrylic polymer comprises from about 5 to about 20 weight percent chlorinated polyolefin.

7. A process as recited in claim 6 wherein the acrylic polymer has an acid value in the range of from about 30 to about 75.

8. A process for making a water dispersion of a water dispersible ammonia salt of an acrylic polymer, the ammonia salt of the acrylic polymer being the reaction product of a mixture comprising the acrylic polymer having carboxyl groups, ammonia and an organic solvent selected from the group consisting of ethylene glycol monobutyl ether and a mixture of the ether and a substantially water immiscible organic solvent in a neutralization reaction, the acrylic polymer having a weight average molecular weight in the range of from about 30,000 to about 300,000 and an acid value in the range of from about 15 to about 100, the dispersion having at least about 30 weight percent acrylic polymer and salts thereof as solids, the process comprising:

adding water to a dispersion of the acrylic polymer or the ammonia salt of the acrylic polymer in the organic solvent, to form an acrylic polymer ammonium salt/organic solvent/water mixture, the organic solvent and water being in amounts effective for forming an azeotrope having a boiling point in the range of from about 95° C. to about 99° C.;

inverting the mixture and forming an organic solvent in water azeotrope; and heating the azeotrope to remove the organic solvent; condensing the water and organic solvent being removed from the water dispersion;

lowering the temperature of the water and ether to effect a separation of the ether from the water; and circulating the water separated from the ether back into the mixture to provide an aqueous dispersion of the ammonia salt of the acrylic polymer having less than 2 weight percent of organic solvent.

9. A process as recited in claim 8 wherein the reaction mixture includes the substantially water immiscible organic solvent to provide at least two organic solvents, one of which is ethylene glycol monobutyl ether, the mixture of solvents comprising from about 10 to about 25 weight percent ethylene glycol monobutyl ether, based upon the weight of organic solvent.

10. A process as recited in claims 8 or 9 wherein the acrylic polymer has an acid value in the range of from about 30 to about 75.

11. A process as recited in claims 8 or 9 wherein the acrylic polymer is the reaction product of an extension reaction of a precursor acrylic polymer and diisocyanate.

* * * * *